(12) United States Patent
Herzog et al.

(10) Patent No.: US 11,198,251 B2
(45) Date of Patent: Dec. 14, 2021

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE);
Florian Bechmann, Lichtenfels (DE);
Peter Pontiller-Schymura, Neudrossenfeld (DE)

(73) Assignee: CONCEPT LASER GMBH, Lichtenfels (DE)

( * ) Notice: Subject to any disclaimer, the term of this patent is extended or adjusted under 35 U.S.C. 154(b) by 33 days.

(21) Appl. No.: 15/709,281

(22) Filed: Sep. 19, 2017

(65) Prior Publication Data

US 2018/0111317 A1 Apr. 26, 2018

(30) Foreign Application Priority Data

Oct. 20, 2016 (DE) .......................... 102016120044.1

(51) Int. Cl.
*B29C 64/268* (2017.01)
*B29C 64/295* (2017.01)
(Continued)

(52) U.S. Cl.
CPC ............ *B29C 64/268* (2017.08); *B22F 10/20* (2021.01); *B23K 26/034* (2013.01);
(Continued)

(58) Field of Classification Search
CPC . B29C 64/268; B29C 35/0805; B29C 64/295; B29C 64/153; B29C 64/393;
(Continued)

(56) References Cited

U.S. PATENT DOCUMENTS 6,347,101 B1 * 2/2002 Wu .................... H01S 3/0941
372/18
2003/0231669 A1 * 12/2003 Kozlovsky .......... H01S 5/02236
372/36
(Continued)

FOREIGN PATENT DOCUMENTS

CN         105188993 A    12/2015
DE     102013/226670 A1    6/2014
(Continued)

OTHER PUBLICATIONS

Chinese Office Action Corresponding to Application No. 2017106903994 dated Aug. 14, 2017.
(Continued)

*Primary Examiner* — Francisco W Tschen
*Assistant Examiner* — Guy F Mongelli
(74) *Attorney, Agent, or Firm* — Dority & Manning, P.A.

(57) ABSTRACT

An apparatus (1) for additive manufacturing of three-dimensional objects (2) by successive, selective layer-by-layer exposure and thus solidification of construction material layers of a construction material (3) that can be solidified by means of an energy beam, comprising at least one temperature control device (11), which is provided for at least partial temperature control of a construction material layer formed in a construction plane, wherein the temperature control device (11) comprises at least one temperature control element (12), which is provided for generating an, especially electromagnetic, temperature control beam, wherein the at least one temperature control element (12) is formed as or comprises a temperature control diode.

9 Claims, 3 Drawing Sheets

Figure 1:
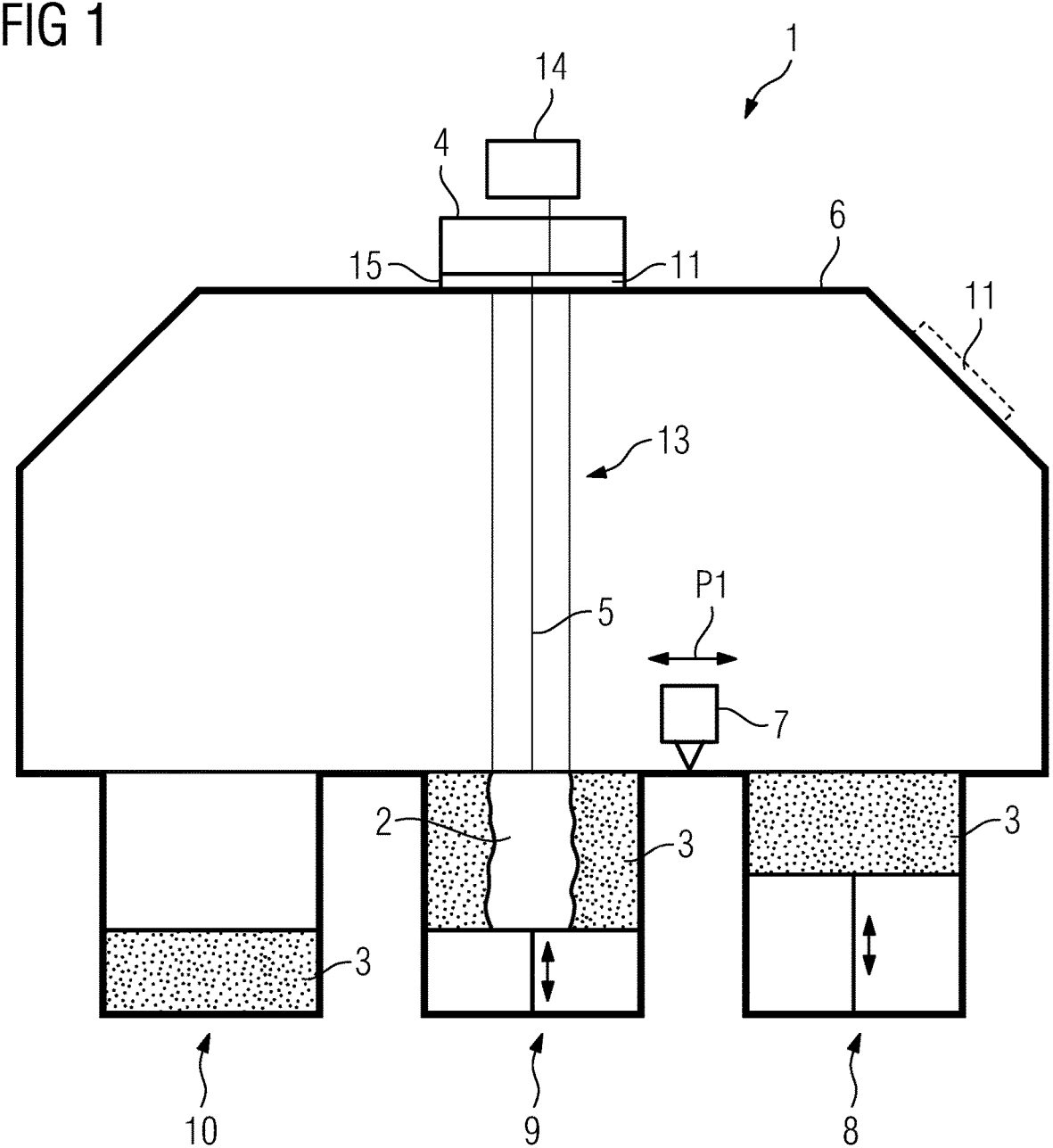

(51) Int. Cl.
- *B33Y 10/00* (2015.01)
- *B33Y 50/02* (2015.01)
- *B29C 35/08* (2006.01)
- *B22F 10/20* (2021.01)
- *B33Y 30/00* (2015.01)
- *B23K 26/342* (2014.01)
- *B29C 64/153* (2017.01)
- *B29C 64/393* (2017.01)
- *B23K 26/03* (2006.01)
- *B23K 26/06* (2014.01)
- *B28B 1/00* (2006.01)
- *B28B 17/00* (2006.01)
- *B22F 10/30* (2021.01)

(52) U.S. Cl.
CPC ........ *B23K 26/0626* (2013.01); *B23K 26/342* (2015.10); *B28B 1/001* (2013.01); *B28B 17/0081* (2013.01); *B29C 35/0805* (2013.01); *B29C 64/153* (2017.08); *B29C 64/295* (2017.08); *B29C 64/393* (2017.08); *B33Y 10/00* (2014.12); *B33Y 30/00* (2014.12); *B33Y 50/02* (2014.12); *B22F 10/30* (2021.01)

(58) Field of Classification Search
CPC .............. B23K 26/034; B23K 26/0626; B23K 26/342; B28B 17/0081; B28B 1/001; B33Y 10/00; B33Y 50/02; B33Y 30/00; B22F 2003/1057; B22F 3/1055
See application file for complete search history.

(56) References Cited

U.S. PATENT DOCUMENTS

| | | | | |
|---|---|---|---|---|
| 2005/0133493 | A1* | 6/2005 | Kirkpatrick | H05B 3/26 219/542 |
| 2009/0252940 | A1* | 10/2009 | Gouda | G02B 6/1221 428/213 |
| 2011/0243167 | A1* | 10/2011 | Castillo | H01S 5/06804 372/34 |
| 2013/0199013 | A1* | 8/2013 | Graichen | B22F 9/24 29/402.09 |
| 2014/0175708 | A1 | 6/2014 | Echigo et al. | |
| 2014/0263209 | A1* | 9/2014 | Burris | B23K 26/034 219/121.62 |
| 2014/0265046 | A1 | 9/2014 | Burris et al. | |
| 2014/0271328 | A1* | 9/2014 | Burris | B23K 26/0608 419/53 |
| 2015/0202826 | A1 | 7/2015 | Paternoster et al. | |
| 2015/0251247 | A1* | 9/2015 | Monsheimer | C04B 35/64 219/76.11 |
| 2015/0343688 | A1* | 12/2015 | Goodman | B33Y 30/00 264/39 |
| 2015/0367415 | A1* | 12/2015 | Buller | B23K 15/0093 419/53 |
| 2015/0367448 | A1* | 12/2015 | Buller | B29C 64/171 219/74 |
| 2016/0263831 | A1* | 9/2016 | Li | B29C 64/20 |
| 2016/0279707 | A1 | 9/2016 | Thomas et al. | |
| 2016/0298220 | A1* | 10/2016 | Bruck | B22F 3/1055 |
| 2017/0072643 | A1* | 3/2017 | Ng | B29C 64/236 |
| 2017/0136578 | A1 | 5/2017 | Hitoshi | |
| 2017/0297110 | A1 | 10/2017 | Echigo et al. | |
| 2018/0361662 | A1* | 12/2018 | Paternoster | B22F 12/00 |
| 2018/0369910 | A1* | 12/2018 | Gunther | B29C 64/209 |
| 2019/0084227 | A1* | 3/2019 | Paternoster | B28B 17/0081 |
| 2019/0091921 | A1* | 3/2019 | Paternoster | B22F 12/00 |

FOREIGN PATENT DOCUMENTS

| | | |
|---|---|---|
| DE | 102014/204580 A1 | 9/2015 |
| EP | 2292413 A2 | 3/2011 |
| JP | 2014/125643 A | 7/2014 |
| JP | 2016/516580 A | 6/2016 |
| WO | WO2006/105827 A1 | 10/2006 |
| WO | WO2014/120736 A1 | 8/2014 |
| WO | 2015/826319 A | 9/2015 |
| WO | 2015151864 A1 | 10/2015 |
| WO | 2016077250 A1 | 5/2016 |

OTHER PUBLICATIONS

European Search Opinion Corresponding to Application No. 17174401.4 dated Nov. 9, 2017.
European Search Report Corresponding to Application No. 17174401 dated Nov. 9, 2017.
German Search Report Corresponding to Application No. 102016120044.1 dated Oct. 29, 2018.
Japanese Office Action Corresponding to Application No. 2017165110 dated Aug. 31, 2018.
Japanese Office Action Corresponding to Application No. 2017165110 dated Aug. 28, 2019.
European Office Action Corresponding to Application No. 1714401 dated Apr. 16, 2019.
European Search Report Corresponding to Application No. 20178609 dated Aug. 27, 2020.

* cited by examiner

APPARATUS FOR ADDITIVELY MANUFACTURING OF THREE-DIMENSIONAL OBJECTS

CROSS-REFERENCE TO RELATED APPLICATIONS

This application claims priority to German Patent Application serial no. 10 2016 120 044.1 filed Oct. 20, 2016, the contents of which is incorporated herein by reference in its entirety as if set forth verbatim.

The invention relates to an apparatus for additive manufacturing of three-dimensional objects by successive, selective layer-by-layer exposure and thus solidification of construction material layers of a construction material that can be solidified by means of an energy beam.

Respective apparatuses for additive manufacturing of three-dimensional objects are per se known. By means of respective apparatuses, three-dimensional objects are additively constructed by successive, selective layer-by-layer exposure and thus solidification of construction material layers formed in a construction plane, of a construction material that can be solidified by means of an energy beam.

Occasionally, a temperature control of respective construction material layers can be purposeful, possibly even required. The temperature control especially serves to reduce thermally induced tensions within the respective object (portion) such that by a specific temperature control influence on the structural properties of the object to be additively manufactured or additively manufactured can be exerted. Accordingly, apparatuses of the type mentioned at the beginning are regularly equipped with temperature control devices, which are provided for at least partial temperature control of a construction material layer formed in a construction plane.

Known temperature control devices normally enable only a static temperature control of respective construction material layers. With such known temperature control devices it is, if at all, only possible with comparatively great effort to realize, e.g. in terms of different thermal properties of different construction materials, a temperature control of respective construction material layers that is individually adjustable.

The invention is based on the object of providing, especially in terms of the possibility of a temperature control of respective construction material layers that can individually be adjusted, an improved apparatus for additive manufacturing of three-dimensional objects.

The object is solved by an apparatus for additive manufacturing of three-dimensional objects according to claim 1. The dependent claims relate to possible embodiments of the apparatus.

The apparatus described herein ("apparatus") is provided for additive manufacturing of three-dimensional objects, i.e. for example technical components or technical component groups, respectively, by successive, selective layer-by-layer exposure and thus solidifying construction material layers of a construction material that can be solidified by means of an energy beam, especially a laser beam. The construction material can be a particulate or powdered metal material, plastic material and/or ceramic material. The selective solidification of respective construction material layers to be selectively solidified is carried out based on object-related construction data. Respective construction data describe the geometric structural design of the respective object to be additively manufactured and can for example include "sliced" CAD data of a respective object to be additively manufactured.

The apparatus can be an SLM apparatus, i.e. an apparatus for performing selective laser melting methods (SLM methods), especially LaserCUSING® methods, or an SLS apparatus, i.e. an apparatus for performing selective laser sintering methods (SLS methods).

The apparatus comprises the functional components typically required for performing additive construction process, i.e. especially an energy beam generation device for generating an energy beam, i.e. especially a laser beam, for the successive, selective layer-by-layer exposure and thus solidification of construction material layers, and a coating device for forming construction material layers to be selectively exposed or to be selectively solidified in a construction plane. Then, in the construction plane the actual selective exposure or the actual selective solidification of respective construction material layers to be selectively solidified is carried out; in general, in a construction plane at least one construction material layer to be selectively solidified or selectively solidified is formed. Additive construction processes performed by means of the apparatus are carried out in an inertable process chamber associated with the apparatus.

The process chamber can form a part of an (outer) housing structure of the apparatus, on or in which functional components of the apparatus are arranged or formed.

The apparatus comprises a temperature control device as another functional component. The temperature control device is a functional component of the apparatus separate to the energy beam generation device. The temperature control device is provided for the at least section-wise temperature control of a construction material layer formed in a construction plane that especially is (yet) to be selectively solidified or (already) selectively solidified. As it follows from below, the temperature control device is provided for a locally limited temperature control of individual or several connected or disconnected sections of a construction material layer to be temperature controlled. A temperature control of a construction material layer can be understood as (controlled) heating-up of at least one section of a construction material layer to a certain heating temperature or a certain heating temperature range and/or keeping a heated section at a heating temperature or a heating temperature range as well as (controlled) cooling of at least one section of a construction material layer to a certain cooling temperature or a certain cooling temperature range and/or keeping a cooled section at a cooling temperature or a cooling temperature range.

The temperature control device comprises at least one temperature control element. The temperature control element is provided for generating an, especially electromagnetic, temperature control beam. The temperature control that can be realized by means of the temperature control device is thus carried out by means of at least one electromagnetic temperature control beam and thus by a specific entering of electromagnetic radiation—as it results from the following laser radiation—in at least one section of a construction material layer to be temperature controlled, to be selectively solidified or selectively solidified.

The temperature control element is formed as or comprises a temperature control diode. A temperature control diode is understood to mean a semiconductor element provided for generating a temperature control beam, which is a laser beam. The optical properties, i.e. for example the wavelength, of the temperature control beam that can be generated using the temperature control diode are among other things dependent on the semiconductor material(s) used. Depending on the specific design, the temperature control diodes can e.g. generate wavelengths between 650 and 2,000 nm, especially between 800 and 1,000 nm, and laser outputs in the range of between 0.1 and 10 watts; of course, upward and downward exceptions are conceivable.

Typically, a temperature control diode is a surface emitter diode, surface emitter in short, which is provided to emit a laser beam vertically from a plane of the semiconductor element forming the actual temperature control diode; the radiating surface of a respective semiconductor element is in the assembly state of the temperature control device typically oriented facing a respective construction material layer to be temperature controlled. Respective surface emitter diodes are also referred to as VCSEL (vertical cavity surface emitting laser) and are characterized, in contrast to other diode designs, i.e. especially in contrast to edge-emitting diodes, especially by beam properties that can be varied, i.e. especially beam profiles, intensities, of the laser beams that can be generated by them. Thus, by means of respective surface emitter diodes different temperature control beams of different beam properties can be generated. In such a way an individual or individually adjustable and, at the same time, homogeneous temperature control of construction material layers is possible.

Special advantages of the apparatus are that by the described design of the temperature control device, i.e. especially by using temperature control diodes, thermal tensions in the construction material layers to be temperature controlled and thus in the object(s) to be additively manufactured or manufactured can be reduced, which has a positive effect on the structural properties, i.e. for example the mechanical stability and the dimensional accuracy of the objects. Further, among other things the temperature-dependent absorption properties of the construction material can be specifically affected.

Overall, especially in terms of the possibility of an individually adjustable temperature control of respective construction material layers, an improved apparatus is provided.

From the aforementioned explanations it follows that the temperature control diodes can typically be varied in at least one temperature control beam parameter regarding the beam properties of the temperature control beam generated by those properties, especially in its output power, intensity, wavelength, etc. Purposefully, the apparatus comprises a control device that is implemented by hardware and/or software, and can be assigned or is assigned to the temperature control device. The control device is provided for controlling the operation, i.e. especially for controlling at least the temperature control beam parameter affecting the beam properties of the temperature control beam generated using a respective temperature control diode, of individual or several temperature control diodes. By means of a control device, an individual actuation of respective temperature control diodes and thus an individually adjustable temperature control of respective construction material layers to be temperature controlled is possible. For example, the geometry of respective temperature control beam profiles can (almost) arbitrarily be adjusted by a respective actuation of individual or several temperature control diodes. Respective temperature control beam profiles can e.g. be strip-shaped such that a locally limited strip-shaped section of a construction material layer to be temperature controlled can be temperature controlled. Of course, this analogously applies to other temperature control beam profile geometries.

By a respective actuation of individual or several temperature control diodes, it is further possible to generate (almost) any temperature control beam profiles that can be changed regarding location and/or time, especially locally limited in terms of a construction material layer to be temperature controlled, which are composed of temperature control beams generated by respective temperature control diodes. In such a way, in connection with a heating-up of construction material layers to be temperature controlled, also any temperature ramps that can be changed regarding location and/or time to a certain heating temperature can be realized. Analogously, in connection with cooling of construction material layers to be temperature controlled also any temperature ramps that can be changed regarding location and/or time can be realized to a certain cooling temperature.

The apparatus can comprise a detection device provided for detecting the temperature of a construction material layer to be temperature controlled. The detection device can be formed as or comprise temperature sensor technology, e.g. in the form of a pyrometer. The or another control device of the apparatus can, if present, be provided to individually control the control of the operation of individual or several temperature control diodes based on detection information generated by the detection device, and describing the detected temperature of a construction material layer to be selectively solidified or selectively solidified in terms of a certain heating-up or cooling temperature. The control of the operation of the temperature control diodes, i.e. in general the temperature control of a construction material layer to be temperature controlled, can thus be accompanied by temperature monitoring of the construction material layer to be temperature controlled.

The temperature control device typically comprises not only one but more temperature control diodes. The temperature control diodes can basically be arranged or are arranged in any spatial arrangement relative to a construction plane, in which respective construction material layers to be temperature controlled are formed. An exemplary arrangement provides that the temperature control diodes or several temperature control diodes in terms of a subset of an overall number of temperature control diodes related to a temperature control device are arranged in a row-like and/or a column-like manner in at least one common plane, especially in parallel to the construction plane. An arrangement of temperature control diodes in connected rows and columns can be referred to as a matrix-like arrangement, matrix in short. A respective matrix thus comprises at least one row, typically several rows arranged in parallel, (each) of at least two temperature control diodes and at least one column, typically several columns arranged in parallel (each) of at least two temperature control diodes. A respective row of temperature control diodes extends angularly, especially perpendicular, to a respective column of temperature control diodes and vice versa.

In addition to the arrangement of temperature control diodes in a common plane described, the temperature control diodes or several temperature control diodes in terms of a subset of an overall number of temperature control diodes related to a temperature control device can be arranged in a row-like and/or a column-like manner in several planes, especially in parallel to the construction plane, on top of each other. An arrangement of temperature control diodes in several planes on top of the other can result in an especially compact, possibly nested, arrangement of respective temperature control diodes. The temperature control diodes arranged in respective planes on top of each other can be arranged in a certain spatial offset relative to each other. The temperature control beam generated by a temperature control diode arranged in an upper plane does not impinge a temperature control diode arranged in a lower plane, but passes through a clearance, e.g. in the form of a gap, a bore or another opening, between temperature control diodes directly adjacently arranged in a lower plane. The arrangement of the temperature control diodes in several planes on top of each other is in any case selected such that the temperature control beams can be directed to a respective construction material layer to be temperature controlled.

The temperature control diodes can—independently of their specific arrangement relative to each other—be arranged on or in an, especially housing-like, holding device. The holding device can be arranged or formed outside or inside the process chamber of the apparatus. The holding device can also be arranged in a process chamber wall of the process chamber. An arrangement of the temperature control device outside the process chamber of the apparatus presupposes a suited irradiation option of the temperature control beams that can be generated or are generated by the temperature control diodes, which e.g. can be realized by a passage window that is arranged or formed in a process chamber wall, and enabling a passage of respective temperature control beams into the process chamber.

Independently of its arrangement outside or inside the process chamber, the holding device can comprise an, especially frame-like or frame-shaped, holding structure, on or in which the temperature control diodes are arranged. The holding structure typically comprises a number of arrangement positions that can be pre-determined or are pre-determined, on or in which at least one temperature control diode can be arranged or is arranged. The arrangement of the temperature control diodes on or in the holding structure can (in a damage-free and non-destructive manner) be detachable, which e.g. facilitates a replacement required, for example in the event of service and/or repair.

The holding device can be movably supported in at least one freedom degree of motion relative to the process chamber of the apparatus or to the construction plane. Movements of the holding device are carried out by an, especially (electro) motor, drive and/or guiding device that can be coupled or is coupled with the holding device. Due to the movements of the holding device it is possible to move the temperature control diodes, e.g. in terms of a specific temperature control situation, relative to a construction material layer to be temperature controlled. Movements of the holding device can include translational freedom degrees of motion along at least one translational axis and/or rotatory freedom degrees of motion around at least one rotational axis. Movements of the holding device can be e.g. linear, rotational, tilting or swiveling movements. Of course, combined movements in several different freedom degrees of motion are possible.

For an arrangement of the holding device within the process chamber, it especially applies that a respective drive and/or guiding device can be provided by a functional component of the apparatus that is arranged within the process chamber of the apparatus movably supported in at least one freedom degree of motion. The holding device can thus be coupled for movement with a functional component of the apparatus that is arranged within the process chamber of the apparatus movably supported in at least one freedom degree of motion. The functional component of the apparatus can e.g. be the coating device, which is provided for forming construction material layers to be selectively exposed or to be selectively solidified in the construction plane. The coating device is typically movably supported in a translational freedom degree of motion relative to the construction plane. The holding device can thus be coupled for movement with the coating device, which e.g. can be realized such that the holding device is directly or indirectly, i.e. by interconnecting at least one component or component group, arranged on the coating device.

As mentioned, the holding device can comprise an, especially frame-like or frame-shaped, holding structure, on or in which the temperature control diodes are arranged. Movements of the temperature control diodes, e.g. in terms of a specific temperature control situation, relative to a construction material layer to be temperature controlled can also be realized such that at least one temperature control diode is movably supported on or in the holding structure relative to the holding structure and thus also relative to a construction material layer to be temperature controlled in at least one freedom degree of motion. Regarding the holding structure, for this purpose a suited drive and/or guiding device is intended, by means of which movements of temperature control diodes can be realized. The explanations above in connection with the movement of the holding device relative to the construction plane analogously apply to the movement of a temperature control diode relative to the holding structure.

In addition to the apparatus the invention relates to a method for additive manufacturing of three-dimensional objects by successive, selective layer-by-layer exposure and thus solidification of construction material layers formed in a construction plane, of a construction material that can be solidified by means of an energy beam. The method characterizes in that for performing thereof an apparatus as described is used. Consequently, all explanations in connection with the apparatus analogously apply to the method.

Figure 3:
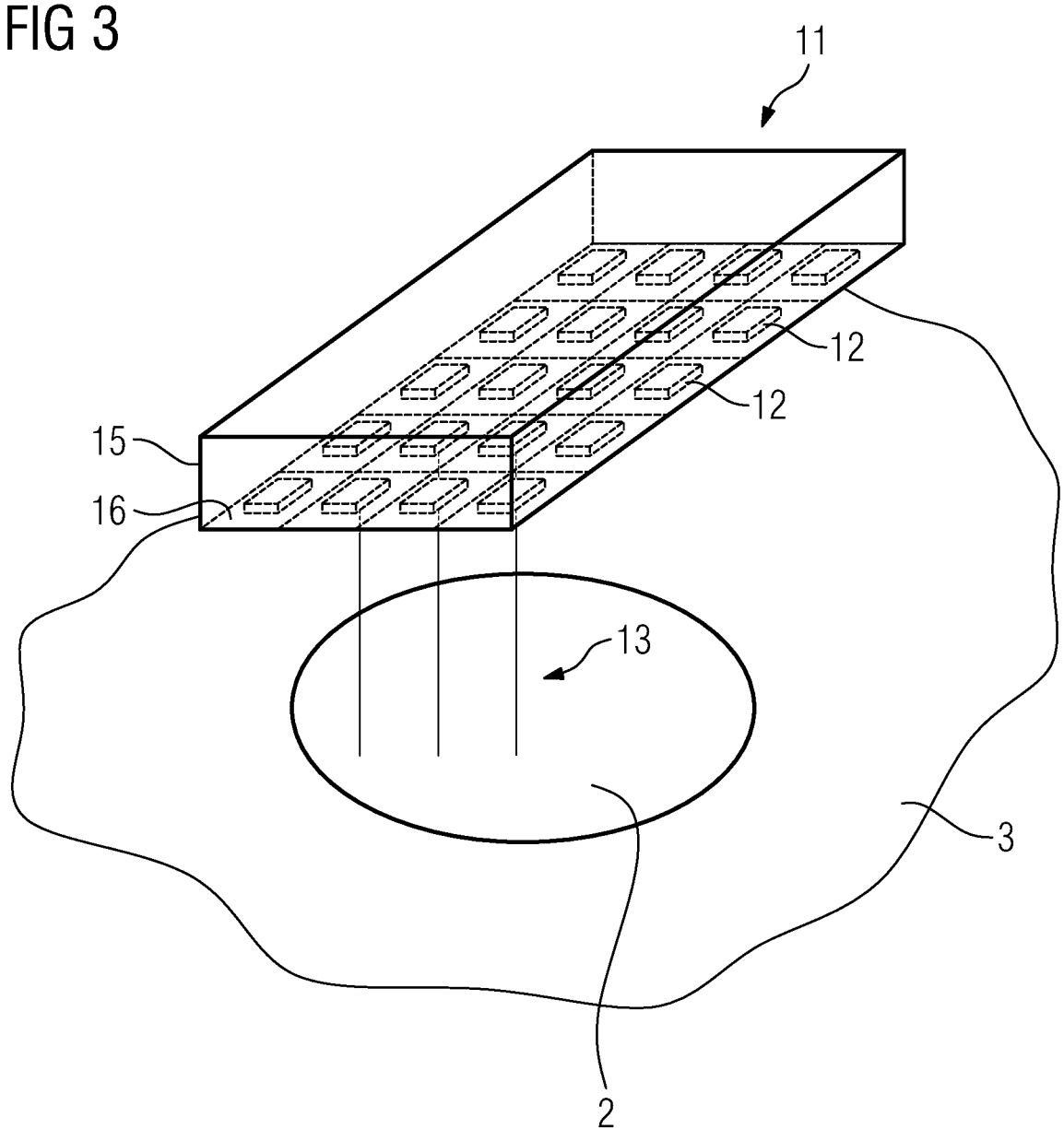

The invention is explained in more detail by means of exemplary embodiments in the figures of the drawings. In which:

FIG. 1, 2 each show a schematic diagram of an apparatus according to an exemplary embodiment; and FIG. 3 shows a schematic diagram of a temperature control device according to an exemplary embodiment.

FIG. 1 shows a schematic diagram of an apparatus 1 according to an exemplary embodiment. The apparatus 1 serves the additive manufacturing of three-dimensional objects 2, i.e. especially technical components or technical component groups, respectively, by successive, selective layer-by-layer exposure and thus solidification of construction material layers of a powdered construction material 3, i.e. a metal powder, that can be solidified by means of a laser beam 5 generated by a laser beam generation device 4. The selective exposure and thus the selective solidification of respective construction material layers to be solidified is carried out based on object-related construction data. Respective construction data describe the geometric or geometric structural design of the respective object 2 to be additively manufactured. Respective construction data can for example include "sliced" CAD data of the object 2 to be manufactured.

The apparatus 1 comprises an inertable process chamber 6, in which the actual additive manufacturing of respective objects 2 is carried out. The process chamber 6 can form a part of a housing structure (not shown) of the apparatus 1. In the process chamber 6 at least one part of the functional components of the apparatus 1, required for performing additive construction processes, i.e. especially a coating device 7 movably supported as indicated by the horizontally oriented double arrow P1, and provided for forming construction material layers in a construction plane, to be solidified, is arranged or formed. Apparently, functional modules, i.e. specifically a powder module 8 for providing powdered construction material 3, a construction module 9, in which the actual additive construction of the object 2 is carried out, and an overflow module 10 for receiving non-solidified construction material 3 are arranged on or in the process chamber 6. The functional modules can be detachably connected or are detachably connected to the process chamber 6 in terms of replacement containers.

The apparatus 1 comprises a temperature control device 11 as another functional component. The temperature control device 11 is a functional component of the apparatus 1 separate to the energy beam generation device 4. The temperature control device 11 is provided for the at least section-wise temperature control of a construction material layer formed in a construction plane, especially to be selectively solidified (yet) or (already) selectively solidified. A temperature control of a construction material layer is to be understood as a (controlled) heating-up of at least one section of a construction material layer to a certain heating temperature or a certain heating temperature range and/or keeping a heated section at a heating temperature or a heating temperature range as well as a (controlled) cooling of at least one section of a construction material layer to a certain cooling temperature or a certain cooling temperature range and/or keeping a cooled section at a cooling temperature or a cooling temperature range.

The temperature control device 11 comprises several temperature control elements 12 (cf. FIG. 3). The temperature control elements 12 are each provided for generating an, especially electromagnetic, temperature control beam. The temperature control beams generated by the respective temperature control elements 12 make up a temperature control beam profile 13. The temperature control that can be realized by means of the temperature control device 11 is thus carried out by means of an electromagnetic temperature control radiation and thus by a specific entering of electromagnetic radiation into at least one section of a construction material layer to be temperature controlled.

The temperature control elements 12 are each formed as a temperature control diode, i.e. specifically as surface emitter diode. A temperature control diode is understood to mean a semiconductor element provided for generating a temperature control beam, which is a laser beam. The optical properties, i.e. for example the intensity and the wavelength, of the temperature control beam that can be generated using the temperature control diode are among other things dependent on the semiconductor material(s) used. Depending on specific design, the temperature control diodes can e.g. generate wavelengths between 800 and 1,000 nm and laser outputs in the range of between 0.1 and 10 watts. The surface emitter diodes used as temperature control diodes are characterized by beam properties of the laser beams generated by that, which can be varied. Thus, by means of surface emitter diodes different temperature control beams of different beam properties can be generated. In such a way an individual or individually adjustable and, at the same time, homogeneous temperature control of construction material layers is possible.

The temperature control diodes can thus typically vary in at least one temperature control beam parameter regarding the beam properties of the temperature control beam generated by those properties, especially in its output power, intensity, wavelength, etc. The apparatus 1 comprises a control device 14 that is implemented by hardware and/or software, and is assigned to the temperature control device 11. The control device 14 is provided for controlling the operation, i.e. especially for controlling at least the temperature control beam parameter affecting the beam properties of the temperature control beam generated using a respective temperature control diode, of individual or several temperature control diodes. By means of a control device 14 an individual actuation of respective temperature control diodes and thus an individually adjustable temperature control of respective construction material layers to be temperature controlled is possible. For example the geometry of respective temperature control beam profiles 13 can (almost) arbitrarily be adjusted by a respective actuation of individual or several temperature control diodes. Respective temperature control beam profiles 13 can e.g. be strip-shaped such that a locally limited strip-shaped section of a construction material layer to be temperature controlled can be temperature controlled. Of course, this analogously applies to other temperature control beam profile geometries.

By a respective arrangement of individual or several temperature control diodes it is further possible to generate (almost) any temperature control beam profile that can be changed regarding location and/or time. In such a way, in connection with a heating-up of construction material layers to be temperature controlled, also any temperature ramps that can be changed regarding location and/or time to a certain heating temperature can be realized. Analogously, in connection with cooling of construction material layers to be temperature controlled also any temperature ramps that can be changed regarding location and/or time can be realized to a certain cooling temperature.

The apparatus 1 can comprise a detection device (not shown, since optional) provided for detecting the temperature of a construction material layer to be temperature controlled. The detection device can be formed as temperature sensor technology, e.g. in the form of a pyrometer. The control device 14 can be provided to individually control the control of the operation of individual or several temperature control diodes based on detection information generated by the detection device, and describing the detected temperature of a construction material layer to be selectively solidified or selectively solidified in terms of a certain heating-up or cooling temperature. The control of the operation of the temperature control diodes, i.e. in general the temperature control of a construction material layer to be temperature controlled, can thus be accompanied by temperature monitoring of the construction material layer to be temperature controlled.

From FIG. 3, which shows a schematic diagram of a temperature control device 11 according to an exemplary embodiment, it clearly follows that the temperature control device 11 comprises several temperature control elements 12 or several temperature control diodes. According to the exemplary embodiment shown in FIG. 3, the temperature control diodes are arranged in a row- and column-like manner in a common plane, especially in parallel to the construction plane. This arrangement of temperature control diodes can be referred to as matrix-like arrangement, matrix in short.

In addition to the arrangement of respective temperature control diodes in a common plane shown in FIG. 3, the temperature control diodes can also be arranged in several planes, especially in parallel to the construction plane. The temperature control diodes arranged in respective planes on top of each other can though be arranged in a certain spatial offset relative to each other. The temperature control beam generated by a temperature control diode arranged in an upper plane does not impinge a temperature control diode arranged in a lower plane, but passes through a clearance, e.g. in the form of a gap, a bore or another opening, between temperature control diodes directly adjacently arranged in a lower plane.

From FIG. 3 it can further be seen that the temperature control diodes are arranged on or in a housing-like holding device 15. The holding device 15 comprises a frame-like or frame-shaped holding structure 16, on or in which the temperature control diodes are arranged. The holding structure 16 comprises a number of arrangement positions (not denoted in more detail) that can be pre-determined or are pre-determined, on or in which at least one temperature control diode can be arranged or is arranged. The arrangement of the temperature control diodes on or in the holding structure 16 can be detachable (in a damage-free and non-destructive manner).

Referring back to FIG. 1 it is seen that the holding device 15 and thus the temperature control device 11 can be arranged or formed outside the process chamber 6. Specifically, the holding device 15 is arranged or formed in the section of a process chamber wall forming a ceiling section of the process chamber 6. An alternative arrangement option of the or another holding device 15, which is arranged or formed in the section of an exemplarily inclined process chamber wall forming a side section of the process chamber, is shown as a dashed line. The mentioned arrangement options of the temperature control device 11 outside the process chamber of the apparatus presupposes a suited irradiation option of the temperature control beams that can be generated or are generated by the temperature control diodes, which e.g. can be realized by a passage window that is arranged or formed in a process chamber wall, and is enabling a passage of respective temperature control beams into the process chamber 6.

The holding device 15 can also be arranged in a process chamber wall of the process chamber 6 in an integrated manner.

Although not shown in FIG. 1, it is possible that the holding device 15 or the temperature control device 11 is movably supported in a freedom degree of motion relative to the process chamber 6 or the construction plane. Movements of the holding device 15 can be carried out by an, especially (electro) motor, drive and/or guiding device that can be coupled or is coupled with the holding device. Due to the movements of the holding device 15 it is possible to move the temperature control diodes, e.g. in terms of a specific temperature control situation, relative to a construction material layer to be temperature controlled. Movements of the holding device 15 can include translational freedom degrees of motion along at least one translational axis and/or rotatory freedom degrees of motion around an at least one rotational axis. Movements of the holding device 15 can be e.g. linear, rotational, tilting or swiveling movements.

Figure 2:
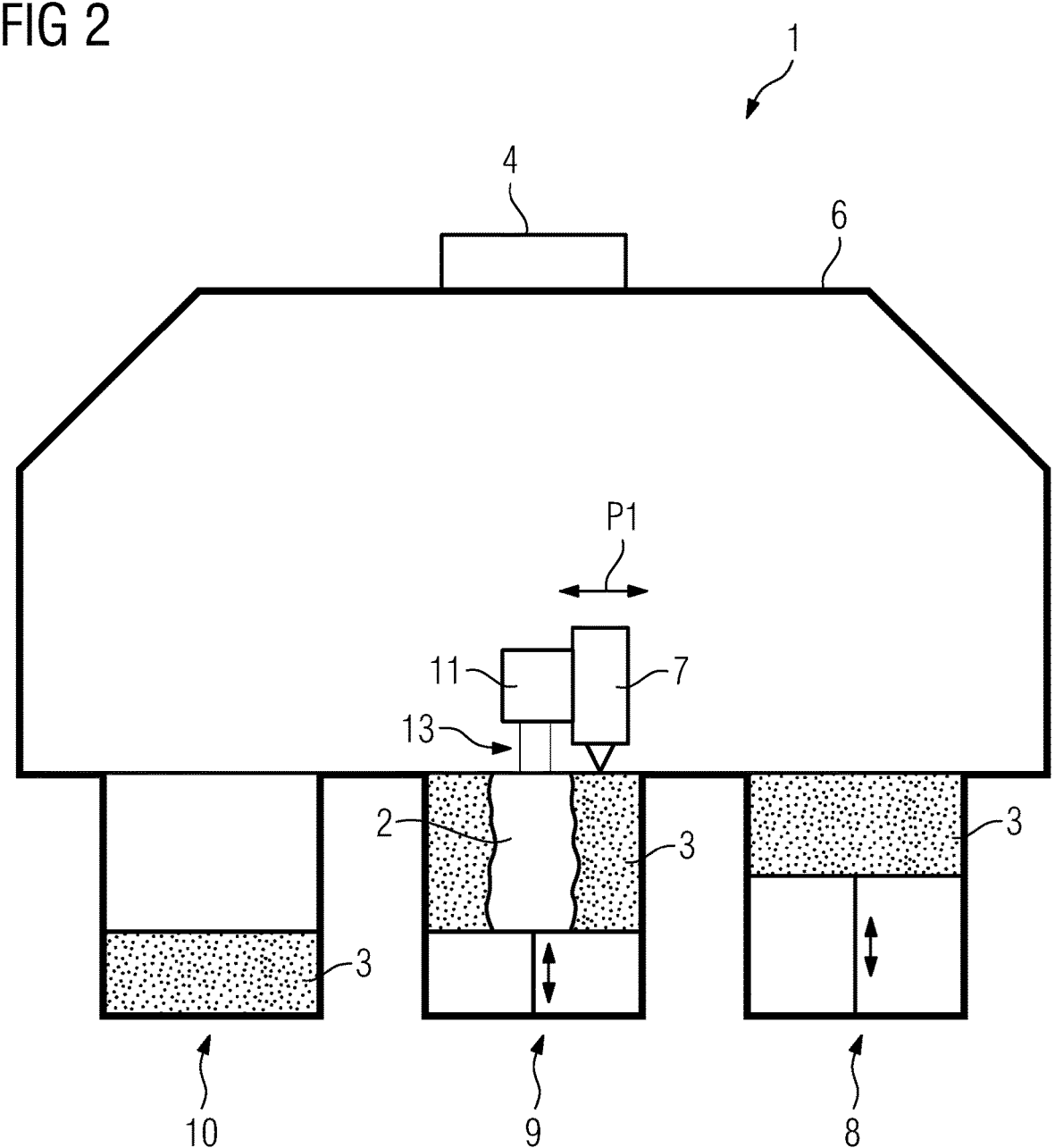

FIG. 2 shows a schematic diagram of an apparatus 1 according to another exemplary embodiment. In contrast to the exemplary embodiment shown in FIG. 1, the holding device 15 or the temperature control device 11 is arranged within the process chamber 6. The holding device 15 is movably supported in a freedom degree of motion relative to the process chamber 6 or to the construction plane. This is realized such that the holding device 15 is arranged on a functional component of the apparatus 1 that is movably supported within the process chamber 6 in at least one freedom degree of motion. The functional component is a coating device 7, which, as indicated by the arrow P1, is movably supported in a translational freedom degree of motion relative to the construction plane. Of course, a stationary arrangement of the holding device 15 or the temperature control device 11 within the process chamber 6 is also conceivable.

It applies to all exemplary embodiments that movements of the temperature control diodes relative to a construction material layer to be temperature controlled can be alternatively or complementary also realized such that individual or several temperature control diodes relative to the holding structure 16 and thus relative to a construction material layer to be temperature controlled are movably supported on or in the holding structure 16 in at least one freedom degree of motion. On the part of the holding structure 16 for this purpose a suited drive and/or guiding device (not shown) is intended, by means of which movements of temperature control diodes can be realized.

With the apparatuses 1 shown in FIG. 1, 2 a method for additive manufacturing of three-dimensional objects 2 by successive, selective layer-by-layer exposure and thus solidification of construction material layers formed in a construction plane, of a construction material 3 that can be solidified by means of an energy beam 5 can be implemented.

The invention claimed is:

1. An apparatus for additively manufacturing three-dimensional objects, the apparatus comprising:
   an energy beam generation device configured to provide successive, selective layer-by-layer exposure and thus solidification of layers of a construction material;
   a process chamber within which the successive, selective layer-by-layer exposure and thus solidification of layers of the construction material is carried out;
   a coating device configured to move in at least one freedom degree of motion relative to the process chamber and to form layers of construction material in a construction plane within the process chamber; and
   a temperature control device comprising:
      a holding device disposed within the process chamber, wherein the holding device is adjacent and connected to the coating device such that movement of the coating device causes movement of the holding device; and
      a plurality of temperature control diodes distal the energy beam generation device and movably supported on or in the holding device relative to the holding structure, the plurality of temperature control diodes configured to generate a temperature control beam configured to control the temperature of respective layers of construction material having been formed by the coating device;
   wherein the holding device is movably supported in at least one freedom degree of motion relative to the process chamber.

2. The apparatus of claim 1, wherein the plurality of temperature control diodes are arranged in rows or columns in at least one plane.

3. The apparatus of claim 1, wherein the holding device comprises a frame on or in which temperature control diodes are arranged, wherein at least one of the plurality of temperature control diodes are movably supported in at least one freedom degree of motion relative to the frame.

4. The apparatus of claim 1, comprising:
   a controller, the controller configured to control one or more properties of the temperature control beam.

5. The apparatus of claim 4, wherein the one or more properties comprise output power, intensity, and/or wavelength.

6. The apparatus of claim 4, wherein the controller is configured to actuate one or more of the plurality of temperature control diodes to generate the temperature control beam, wherein one or more properties of the temperature control beam are varied with respect to location and/or time at least in part by actuating the one or more of the plurality of temperature control diodes.

7. The apparatus of claim 4, comprising:
a detection device, the detection device configured to detect the temperature of a construction material layer to be temperature controlled, wherein the controller is configured to control one or more of the plurality of the temperature control diodes based at least in part on detection information indicative of the temperature of the construction material layer having been detected by the detection device.

8. The apparatus of claim 7, wherein the detection device comprises a pyrometer.

9. The apparatus of claim 1, wherein the plurality of temperature control diodes comprises a surface emitting diode.

* * * * *